(12) United States Patent
Grenchus, Jr. et al.

(10) Patent No.: US 7,877,285 B2
(45) Date of Patent: *Jan. 25, 2011

(54) SYSTEM AND METHOD FOR FORECASTING DEMANUFACTURING REQUIREMENTS

(75) Inventors: Edward J. Grenchus, Jr., Vestal, NY (US); Robert A. Keene, Endicott, NY (US); Asif Shaikh, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 12/157,743

(22) Filed: Jun. 12, 2008

(65) Prior Publication Data
US 2008/0255916 A1 Oct. 16, 2008

Related U.S. Application Data

(63) Continuation of application No. 09/923,470, filed on Aug. 6, 2001, now Pat. No. 7,412,397.

(51) Int. Cl.
G06Q 10/00 (2006.01)
(52) U.S. Cl. .......................................................... 705/9
(58) Field of Classification Search ....................... 705/9
See application file for complete search history.

(56) References Cited

U.S. PATENT DOCUMENTS

| | | | | |
|---|---|---|---|---|
| 5,111,391 A | 5/1992 | Fields et al. | ................ | 364/401 |
| 5,168,445 A | 12/1992 | Kawashima et al. | ........ | 364/403 |
| 5,424,944 A | 6/1995 | Kelly et al. | ................. | 364/401 |
| 6,226,617 B1 | 5/2001 | Suzuki et al. | .................. | 705/1 |
| 6,249,715 B1 | 6/2001 | Yuri et al. | .................... | 700/111 |
| 6,725,184 B1 | 4/2004 | Gadh et al. | .................... | 703/2 |
| 7,054,824 B1 | 5/2006 | Grenchus et al. | ............... | 705/7 |

OTHER PUBLICATIONS

U.S. Appl. No. 09/524,366 by E. J. Grenchus, et al. for "Method of Demanufacturing a Product.".

Grenches, Ed, Robert Keen, and Charles Nobs. "Composition and Value of Returned Consumer and Industrial Information Technology Equipment." IBM Endicott Asset Recovery Center, Endicott, NY.

Grenchus, Edward, Robert Keene, Robert Luce, and Charles Nobs. "Process of Demanufacturing Computer Equipment as Practiced at IBM's Asset Recovery Center." 1998 IE Solutions '98 Conference, May 10-13, 1998. Banff, Canada, pp. 62-67.

Grenchus, Ed, Robert Keene, Charles Nobs. "Demanufacturing of Information Technology Equipment." The Demanufacturing of Electronic Equipment Conference Oct. 28-30, 1998, Dearfield Beach FL. 157-160.

(Continued)

Primary Examiner—Jonathan G Sterrett
(74) Attorney, Agent, or Firm—Schmeiser, Olsen & Watts; William E. Schiesser

(57) ABSTRACT

Demanufacturing workload is forecast based on anticipated volumes of equipment to be disassembled and/or salvaged, as well as equipment complexity factors determined by disassembly prototyping. Staffing requirements are unique for each customer and are based on the number of pounds needed to be worked during each month and the associated complexity (work content multiplier) for that customer's typical or expected returns.

14 Claims, 4 Drawing Sheets

OTHER PUBLICATIONS

Grenchus, Edward J. "Overview of IBM's Demanufacturing Process." The Demanufacturing of Electronic Equipment conference, Oct. 1997, Deerfield Beach, Florida.

Grencus, Ed, Robert Keene, Bob Luce, Larry Yehle. "A Pragmatic Approach to Demanufacturing Information Technology Equipment." The Demanufacturing of Electronic Equipment Conference, Oct. 28-30, 1998, Deerfield Beach, Florida.

Grenchus, Ed, Shirley Johnson, and Dan McDonnell. "Improving Environmental Performance Through Reverse Logistics at IBM." IEEE International Symposium on Electronics and the Environment. May 7-9, 2001. pp. 236-239.

Bertagnoli, L. "Computers Get a Second Change: Businesses Reuse, Recyle, Donate." Crain's Chicago Business, vol. 23, No. 41, Oct. 2, 2000. pp. SR15-17.

Green, L.A. "Recycling—No More Electronics Dumping in Massachuetts." Environmental Health Perspectives, v.108, No. 9, Sep. 2000. p. A398.

Pascovitz, D. "Recycling: Please Dispose of Properly, Entrepreneurs Look for Ways to Put Old Computers to Good Use." Scientific American, vol. 282, No. 2 Feb. 2000. p. 33.

Schuessler, H. "All Used Up with Someplace to Go." New York Times, Nov. 23, 2000, pp. G1, G9.

Hepp, R. "Obsolete PCs Spur Trash Talk." Chicago Tribune, Feb. 28, 2000. pp. 4:1-2.

LeRoy, W. E. "Scrap from Electronics Seen 'Skyrocketing'." American Metal Market, vol. 106, No. 197 Oct. 14, 1998, p. 10A.

Alster, N. et al. "Are Old PCs Poisoning Us?" Business Week, Issue 3685 Jun. 12, 2000. pp. 78, 80.

Sodhl, Manbir S. and Winston A. Knight. "Models and Tools for End-Of-Life Product Management." *The Demanufacturing of Electronic Equipment*, Oct. 29-31, 1997, vol. 1. Conference Coordinated by: Florida Educational Seminars, Inc. Boca Raton, Florida. 1-9.

Mahoney, Joseph P. "The Risks and Rewards of Electronics Recycling Needs/Benefits Analysis for OEM's and Electronics Recycling Companies," *The Demanufacturing of Electronic Equipment*, Oct. 28-30, 1998. vol. 2. Conference Coordinated by Florida Educational Seminars, Inc. Boca Raton, Florida. 1-4.

Limaye, Etan and Reggie J. Caudill. "System Simulation and Modeling of Electronics Demanufacturing Facilities," *IEEE International Symposium on Electronics & the Environment*, Danvers, Massachusetts, May 11-13, 19999. 238-243.

Das, Sanchoy K. and Shibu Matthew. "Characterization of Material Outputs from an Electronics Demanufacturing Facility," *IEEE International Symposium on Electronics & the Environment*. Danvers, Massachusetts, May 11-13, 1999. 251-256.

Veerakamolmal, Pitipong and SurendraM.Gupta. "A Combinatorial Cost-Benefit Analysis Methodology for Designing Modular Electronic Products for the Environment." *IEEE International Symposium on Electronics & the Environment*, Danvers, Massachusetts, May 11-13, 1999. 268-273.

Lee, Burton H. and Kosuke Ishii. "Demanufacturing Complexity Metrics in Design for Recyclability." Department of Mechanical Engineering, Stanford University, Danford, CA 943-5-4021. IEEE 1997.

Grenchus, Ed, Robert Keene, Charles Nobs, Larry Yehle. The Quest for Environmental and Productivity Improvements at the IBM Demanufacturing and Asset Recovery Center. 2001. From PTO-1449 filed with U.S. Appl. No. 09/524,366.

Sandborn, Peter A. and Cynthia F. Murphy. A Model for Optimizing the Assembly and Disassembly of Electronic Systems. IEEE Transactions on Electronics Packaging Manufacturing, vol. 22, No. 2, Apr. 1999., from Internet.

Sandborn, Peter. Assembly/Disassembly Optimization Model (the "salvage" model). Dec. 24, 1999. From Internet site www.glue.umd.edu/-sandborn/research/salvage.html.

McLees, Lea. Rapid Prototyping—Key to Speedy Manufacturing. Aug. 5, 1997. From Internet site www.gtresearchnews.gatech.edu/reshor/rh-spr97/proto.htm.

SYSTEM AND METHOD FOR FORECASTING DEMANUFACTURING REQUIREMENTS

CROSS REFERENCES TO RELATED APPLICATIONS

This application is a continuation of and claims priority to U.S. patent application Ser. No. 09/923,470 filed 6 Aug. 2001 now U.S. Pat. No. 7,412,397 by Edward J. Grenchus, Jr., Robert A. Keene, and Asif Shaikh for System and Method for Forecasting Demanufacturing Requirements.

U.S. patent application Ser. No. 09/524,366, now U.S. Pat. No. 7,054,824, entitled "Method of Demanufacturing a Product" by E. J. Grenchus, et al., contains subject matter related, in certain respect, to the subject matter of the present application. The above-identified patent application is incorporated herein by reference.

BACKGROUND OF THE INVENTION

1. Technical Field of the Invention

This invention pertains to workload forecasting. More particularly, it relates to workload planning for demanufacturing operations such as dismantle and salvage.

2. Background Art

As the life cycle of computers and other complex electrical equipment continues to decrease due to new technology and improved processing performance, the useful life span of equipment has become correspondingly shorter. Dismantling this equipment and salvaging useful components and materials has become imperative from both an economic and environmental standpoint. As a result, dismantle and salvage companies are faced with an increasing volume and diversity of returned end of life equipment. That is, given the varying complexity of obsolete equipment, planning workload and staffing related to dismantle and salvage operations presents a significant challenge. Dynamic changes are required by such companies to meet the required capacity in people, space, and capital equipment—all costly investments. Therefore, the performance of demanufacturing operations becomes critical to not only ensuring proper environmental disposal options, but also improving process efficiency and minimizing expense.

It is an object of the invention to provide an improved system and method for forecasting staffing and equipment requirements.

It is a further object of the invention to provide a system and method for forecasting staffing and equipment requirements for a demanufacturing enterprise.

It is a further object of the invention to provide a system and method for forecasting staffing and equipment requirements based on customer disposal plans and historical data.

SUMMARY OF THE INVENTION

A system and method for workload planning includes determining for each of a plurality of prospective customers, a projected volume of material for processing; determining for each customer a complexity factor for processing the material; and responsive to the projected volume and complexity factor, determining staffing requirements for processing the material.

In accordance with an aspect of the invention, there is provided a computer program product configured to be operable to project staffing requirements for processing material by projecting material volume, determining a complexity factor for processing that material, and responsive to the complexity factor and volume, determining staffing requirements.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
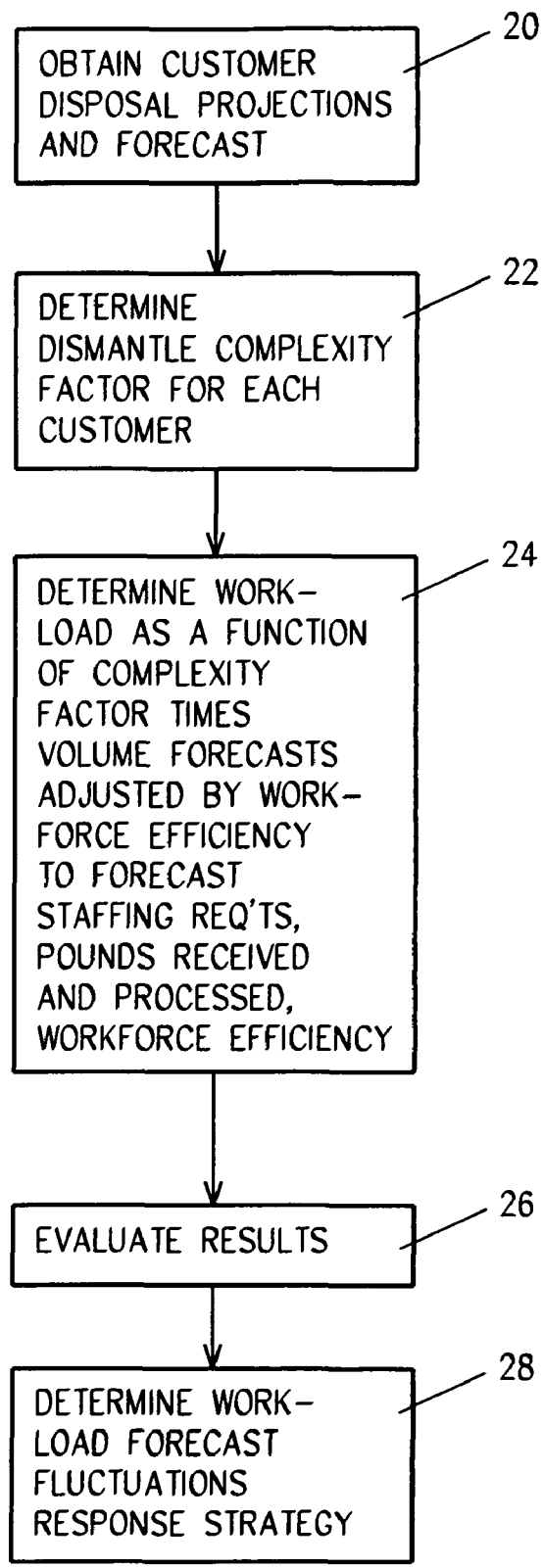
FIG. 1 is a flow chart representation of a preferred embodiment of the method of the invention for determining workload as a function of volume forecasts and complexity factors.

The present invention provides the advantage of forecasting demanufacturing workload based on anticipated volumes of equipment, as well as equipment complexity factors determined by disassembly prototyping.

Anticipated equipment volumes can include such information as the type and number of units of equipment to be dismantled. When equipment of a certain type is received, experienced dismantlers disassemble at least one of that type to determine an equipment complexity factor in a process known as disassembly prototyping. Easily disassembled equipment types will have a relatively lower complexity factor, and equipment types that are difficult to disassemble will have a higher complexity factor. Salvageable and disposable content for a given equipment type will also be determined during disassembly prototyping. Higher salvageable content will indicate a higher complexity factor as care must be taken not to damage salvageable components during disassembly. Additional time must also be taken to properly store salvageable components rather than simply disposing of them. All of this information is then entered into a workload planning model, which calculates a workload forecast. Staffing requirements, with regard to both hiring and resource balancing between projects, can then be based on this forecast.

In accordance with a preferred embodiment of the invention, process requirements (including staffing, capital equipment, and so forth) for a demanufacturing enterprise are defined by determining for each customer a projected work content and dismantle complexity factor.

In accordance with a preferred embodiment of the invention, a demanufacturing workload model is used for monthly planning and in the yearly planning process. Model outputs include (1) documentation of monthly incoming items for demanufacturing and salvage (D&S) by customer; (2) manpower forecast by various categories (i.e., machines, parts, etc.) by month; (3) productivity targets and actual productivity tracked against those targets; and (4) projected pounds received and dismantled by customer by month. This model is updated and distributed periodically, such as monthly) according to the following process. (1) A customers representative provides monthly projections as input to the model. These projections are obtained through discussions with the customer or analysis of past history, and may be for some period, such as a year, into the future. (2) Data received from the customer representative is input to the model, and (3) a report is generated and distributed to process engineers, planning personnel, and management. In general, the intent of each periodic update is to provide a reasonably accurate outlook of the workload for the current month and an estimate for the rest of the year. Manpower and pound processed projections are used to calculate productivity targets.

This model may be implemented as, for example, a Lotus 1-2-3 spreadsheet, which facilitates periodic revision. Data regarding actual returns received, work processed, and staffing is collected on a monthly basis, distributed prior to the model update, and used to aid in the projection of future volumes and workload/staffing. Staffing requirements are unique for each customer and are based on the number of pounds needed to be worked during each month and the associated complexity (work content multiplier) for that customer's returns. Once a year, or as required, a meeting may be held with the appropriate production and engineers to revisit and revise the work content criteria used in the model.

Referring to FIG. 1, an exemplary embodiment of the method of the invention includes the following steps.

In step 20, the enterprise interfaces with each of its customers to obtain equipment or materials disposal or processing needs and forecasts.

Such processing needs and forecasts may include critical operations. Examples of critical operations may be: removal of sensitive parts to prevent disclosure of confidential or trade secret information, recovery of parts needed to satisfy a shortage requirement (usually temporary) for build of other products, removal of parts to prevent their re-use, removal of parts or materials as required by a vendor commodity purchaser—e.g. all plastic must be removed, or removal of hazardous materials as required by regulatory agencies. There may be other reasons or examples of defining optional critical operations. (See Grenchus, et al. U.S. Pat. No. 7,054,824 at Col. 5, lines 1-16; U.S. patent application Ser. No. 09/524,366, entitled "Method of Demanufacturing a Product" by E. J. Grenchus, et al.)

In step 22, the returns from new customers, or new equipment or materials from existing customers, are evaluated to establish a dismantle complexity factor. In a preferred embodiment of the invention, this is accomplished by systematically dismantling machines as prototypes, identifying the work content and resulting items (saleable items, commodities, trash, etc.) This data may then be input to the machine tear down model described in E. J. Grenchus, Jr. et al. Ser. No. 09/524,366, now U.S. Pat. No. 7,054,824, (supra).

In step 24, workload is determined by a workload determination computer model as a function of complexity factor times volume forecasts, adjusted by workforce efficiency and other factors to forecast staffing requirements and other factors, such as projected total and by customer volume received and processed, workload efficiency, and so forth. Volumes may be input as volume of scrap for each month in pounds, pallets, truckloads, etc. The results of the workload determination computer model include monthly forecast of workforce staffing requirements (by customer and total), monthly forecast of volume (preferably represented by pounds) received and processed (by customer and total), monthly forecast of workforce efficiency, plan-to-actual tracking of output, and dismantle and salvage (D&S) workforce subprocess performance.

In step 26 the above results are evaluated, and in step 28 a strategy is determined for responding to workload forecast fluctuations.

In this manner, a user is able to predict future workload fluctuations and address them with less invasive or costly solutions, resulting in greater profit, higher customer satisfaction, and a more stable workforce.

Figure 2:
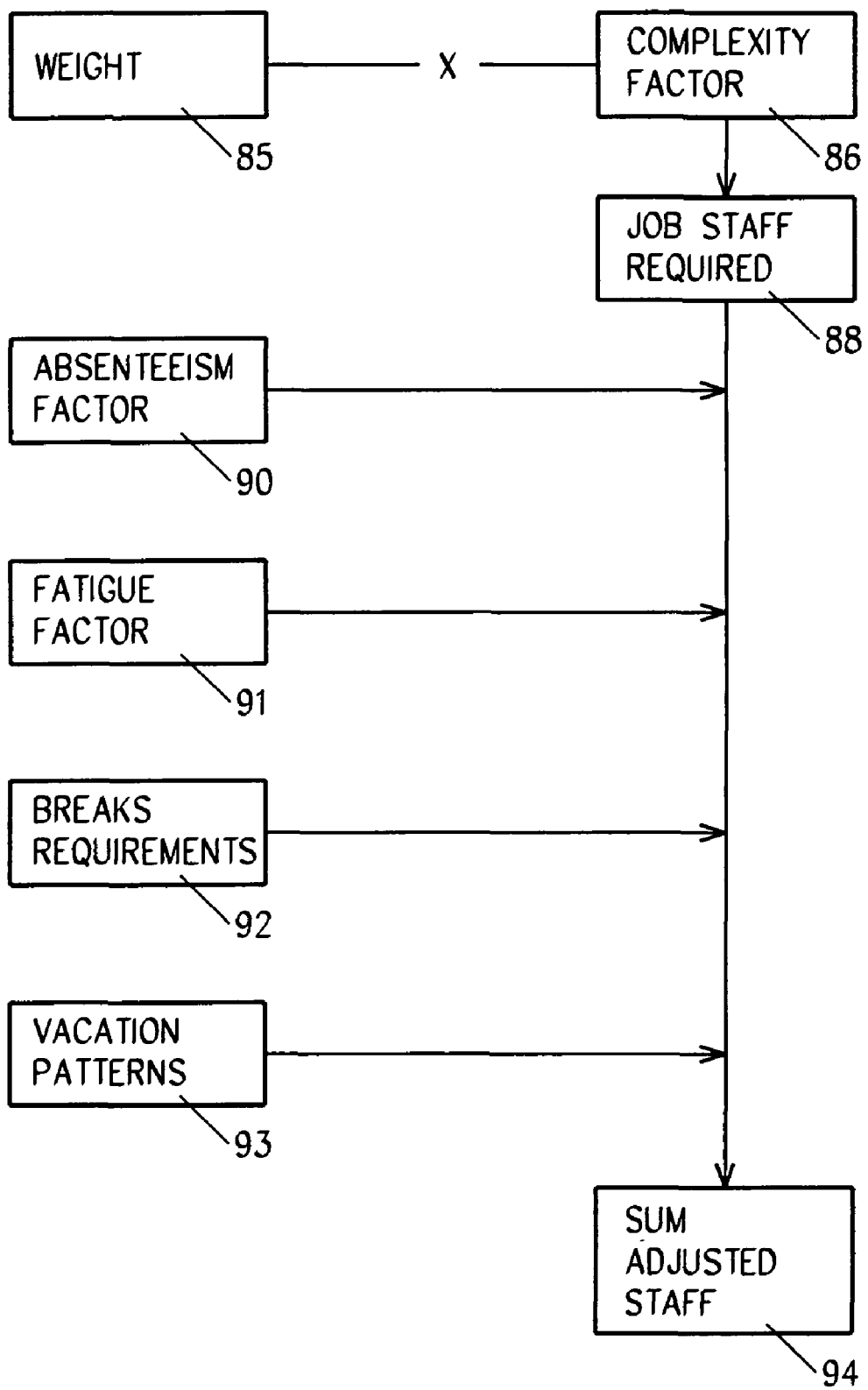
FIG. 2 is a schematic representation of a simple algorithm for calculating demanufacturing staffing requirements in accordance with an exemplary embodiment of the invention.

Referring to FIG. 2, an exemplary forecasting model converts projected customer returns to weight 85, multiplies this by the complexity factor described above to generate a staff requirement 88 for a particular customer. The summation of staff requirements 88 for all customers for a particular time period are adjusted by expected absenteeism factor 90, fatigue factor 91, breaks requirements 92, and vacation patterns 93 to create an adjusted staffing requirement 94 for the enterprise.

Figure 3:
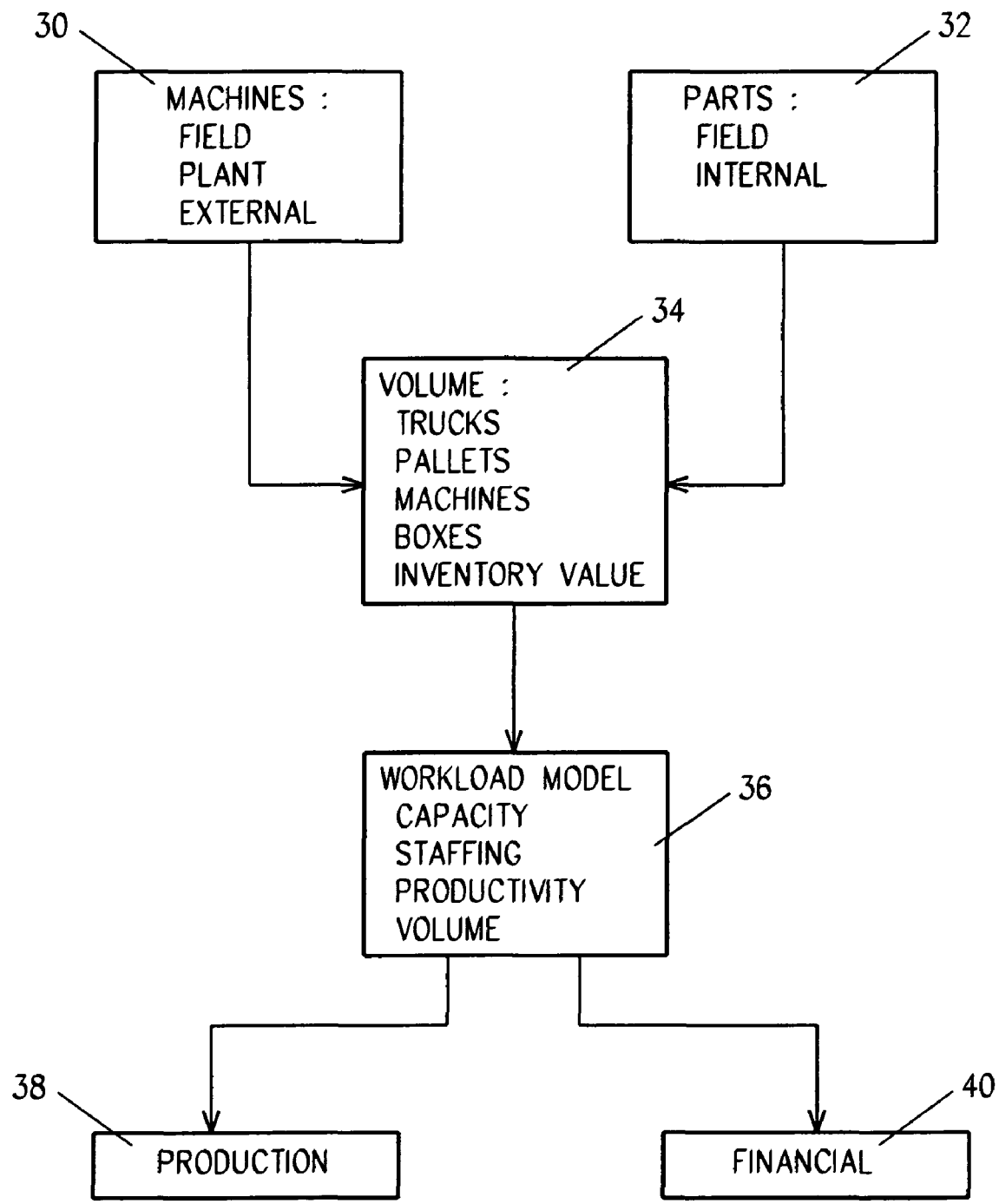
FIG. 3 is a schematic representation of the generation of capacity, staffing, productivity and volume workload as a function truck, pallet, machine, or box volume or dollar value of inventory input to a demanufacturing process.

Referring to FIG. 3, an automated tool is provided for generating staffing and workload answers to a complex problem, where many customers return different amounts of work each month, and each customer has its own unique complexity associated with its work. This exemplary forecasting model determines number of pounds to be addressed and the number of people required to do so. This may be done by converting number of machines 30 from field, plant and external sources, and number of parts 32 from field, external and internal sources, into volume 34. Volume 34 may be represented in truck loads, pallets, machines, boxes, or even dollar value of inventory, or some other equivalent measure adaptable as input to workload model 36. Volume may also be expressed as produce or dry-goods, to deal with a situation involving the stocking of dry-goods and produce—where dry-good stocking would be more complex that stocking produce. Workload model 36, responsive to input 34, generates capacity, staffing, productivity, and volume forecasts which are fed to production 38 and financial 40 personnel for evaluation and planning purposes. The staffing output predicts the number of people required to staff a job(s), and this may be customized to various countries or areas (by varying complexity, absenteeism, fatigue, breaks and vacation factors.

An exemplary embodiment of the invention converts truck loads to pounds, and applies a complexity factor to generate person hours. Conversion of volume measure (pounds, truckload, machine, or pallet, etc.) to persons hours is accomplished by generating a profile for the customer based initially on prototype dismantling and thereafter as modified by experience, or actual history of hours/volume measure.

Figure 4:
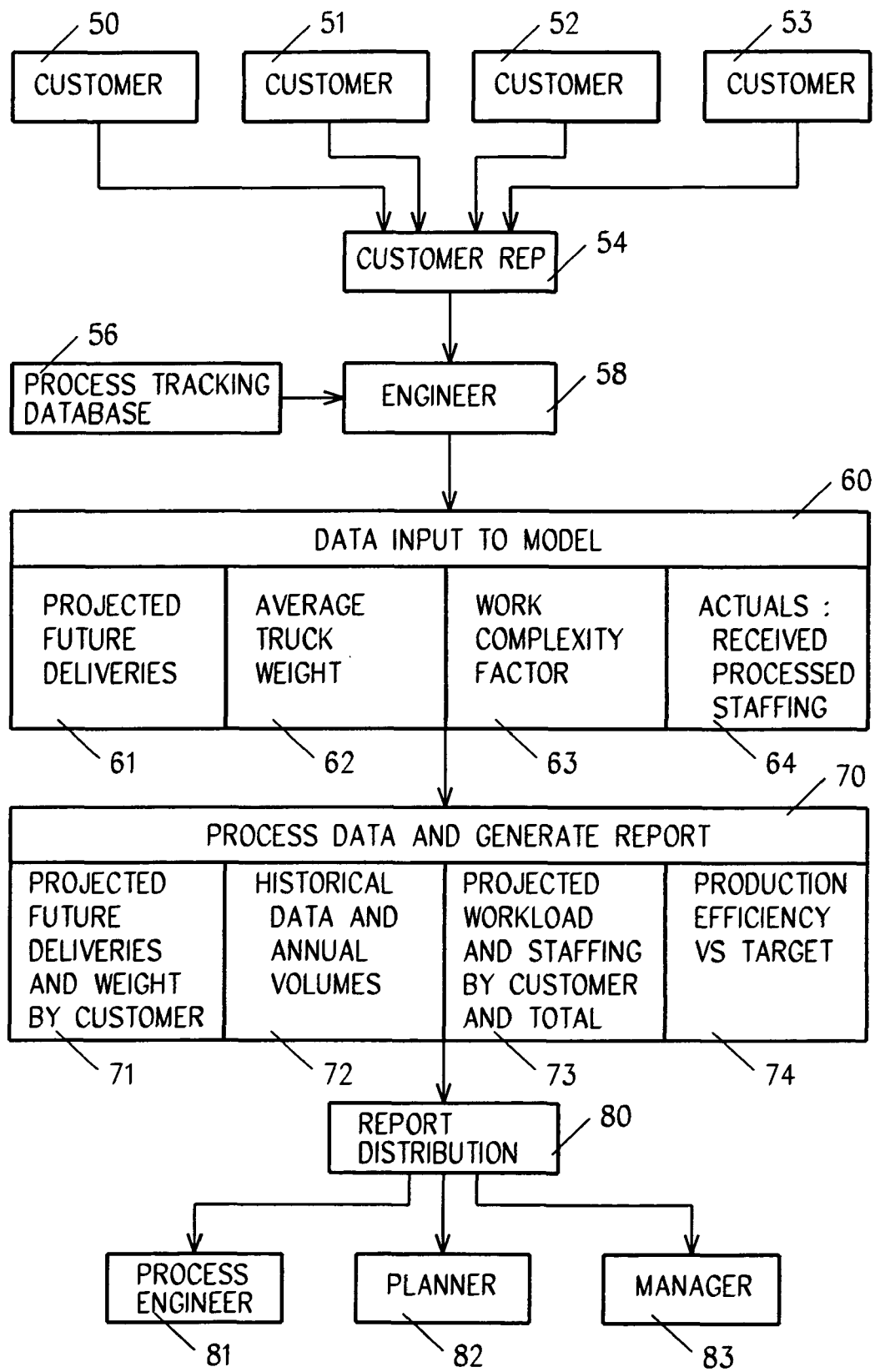
FIG. 4 is a schematic representation of another exemplary embodiment of the system and method the invention.

Referring to FIG. 4, a specific embodiment of the invention provides a workload projection model for a demanufacturing enterprise which has many customers 50-53. Customer representative(s) 54 determines with each customer a plan for future shipments, arranges timing of shipments and establishes contracts for processing those shipments. Engineer 58 receives from customer representative 54 a monthly shipments plan for each customer 50-53 (for example, in trucks or pounds) and monthly updates of that plan for each established and new customer. Engineer 58 also accesses manufacturing process tracking database for actual data on previous work, or arranges for prototype dismantling to generate complexity factors. Input 60 to the model or tool for generating staffing and workload projections includes projected future deliveries 61 for each customer, average truck weight 62 for each customer, customer returns work complexity factor 63, and actual measurements of returns received and processed (such as by trucks or pounds, by customer) and the staffing required. Weight 62 may be established through discussion with the customer 50, historical information derived from manufacturing process tracking database 56, or experience (such as the experience of the customer representative 54 or engineer 58). Output 80 of the workload projection model 70 includes projected future deliveries and volume 71 by customer, historical data monthly and annual volume 72, projected workload and staffing 73 by customer and total, and production efficiency target and actuals 74. This report 80 is distributed to process engineer 81 to monitor area workload and worker efficiency, planner 82 to project costs, spending and staffing, and manager 83 to monitor the plan to outlook and make staffing decisions.

ADVANTAGES OVER THE PRIOR ART

It is an advantage of the invention that there is provided an improved system and method for forecasting staffing and equipment requirements.

It is a further advantage of the invention that there is provided a system and method for forecasting staffing and equipment requirements for a demanufacturing enterprise.

It is a further advantage of the invention that there is provided a system and method for forecasting staffing and equipment requirements based on customer disposal plans and historical data.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device or a physically tangible computer readable storage medium such as magnetic or optical wire, tape or disc, or the like, for storing program code comprising instructions readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the preferred embodiments of the invention have been described with reference to planning, staffing and workload efficiency elements of demanufacturing operations, they are also applicable to any manufacturing or remanufacturing process, and may be adapted to D&S workload planning as well as to other enterprises such as manufacturers and companies where logistical control and associated manpower planning is required.

Accordingly, the scope of protection of this invention is limited only by the following claims and their equivalents.

The invention claimed is:

1. A program storage device readable by a machine, tangibly embodying a program of instructions executable by a machine to perform method steps for workload planning for a demanufacturing process characterized by a plurality of customers each having unique customer specific requirements including demanufacturing complexity and critical operations, said method steps comprising:

determining for each customer of a plurality of customers, a projected quantity of material for processing;

determining from customer specific requirements a unique complexity factor for each customer for processing said material, including, dismantling prototype machines, identifying work content including identifying any critical operations and resulting saleable, commodity, and trash items, said unique complexity factor representing processing time divided by said projected quantity as initially defined during prototype dismantling and subsequently modified by actual experience;

said critical operations including removal of sensitive parts to prevent disclosure of confidential information, recovery of parts needed to satisfy a shortage requirement for build of other products, removal of parts to prevent their re-use, and removal of parts and materials as required by a vendor commodity purchaser;

applying said projected quantity and said unique complexity factors to a spreadsheet workload planning model for forecasting workload requirements for said processing;

periodically updating said projected quantity and said critical operations;

responsive to prior customer product shipment experience and new demanufacturing product prototyping, and responsive to updated projected quantity and updated critical operations, adjusting and applying to said spreadsheet workload planning model said unique complexity factor for each customer of said plurality of customers; and responsive to said projected quantity and said unique complexity factor, determining staffing requirements and productivity targets for processing said material at a plurality of future periods;

determining said staffing requirements for each future period by summing staff requirements for all customers adjusted by expected absenteeism factor, fatigue factor, breaks requirements, and vacation patterns to create an adjusted staffing requirement for said demanufacturing enterprise.

2. The program storage device of claim 1, said method steps further comprising the step of projecting said quantity by volume.

3. The program storage device of claim 1, said method steps further comprising the step of converting said quantity to weight.

4. The program storage device of claim 2, said method steps further comprising the step of converting said volume to weight, and determining said unique complexity factor by prototyping.

5. The program storage device of claim 4, said prototyping step including the step of disassembly prototyping.

6. The program storage device of claim 5, said disassembly prototyping step being applied to new material and further comprising the step of accumulating historical data for determining said unique complexity factor for previously disassembled material.

7. The program storage device of claim 2, said projecting step further comprising the step of determining an expected number of truckloads of said material.

8. The program storage device of claim 5, said disassembly prototyping further including the step of determining salvageable and disposable content for said material of a given equipment type.

9. The program storage device of claim 1, said method steps further comprising the steps of applying said quantity projections and complexity factors to workload planning model for forecasting workload requirements for said processing; and responsive to said workload requirements determining staffing requirements and resource balancing between projects.

10. The program storage device of claim 9, said method steps further comprising the step of adjusting said workload requirements for absenteeism, fatigue, breaks, and vacation pattern factors.

11. The program storage device of claim 9, said workload planning model being implemented as a computer spreadsheet.

12. The program storage device of claim 11, said method steps further comprising the step of periodically updating said workload planning model based upon actual and anticipated changes in quantity projections and complexity factors.

13. The program storage device of claim 10, said method steps further comprising the step of calculating said productivity targets for a demanufacturing enterprise using said quantity projections and complexity factors.

14. A computer program product on a physically tangible computer readable storage medium comprising instructions executable by a processor for forecasting staffing requirements for a demanufacturing enterprise characterized by a plurality of customers each having unique customer specific requirements including demanufacturing complexity and critical operations, comprising:

first program instructions for converting projected customer returns to projected weight, multiplying said projected weight by a complexity factor determined as a unique complexity factor for each customer responsive to customer specific requirements initially by disassembly prototyping and thereafter modified by experience to generate a staff requirement for each of a plurality of customers, said disassembly prototyping including dismantling prototype machines, identifying work content including identifying any critical operations and resulting saleable, commodity, and trash items, each said unique complexity factor calculated as processing time divided by said projected weight;

said critical operations including removal of sensitive parts to prevent disclosure of confidential information, recovery of parts needed to satisfy a shortage requirement for build of other products, removal of parts to prevent their re-use, and removal of parts and materials as required by a vendor commodity purchaser;

second program instructions for applying said projected weight and said unique complexity factors to a spreadsheet workload planning model for forecasting workload requirements for said processing;

third program instructions for periodically updating said projected volume and said critical operations;

fourth program instructions, responsive to said updated projected weight and critical operations, and further responsive to prior customer product shipment experience and new demanufacturing product prototyping, for adjusting and applying to a spreadsheet workload planning model said updated projected weight and said unique complexity factor for each customer of said plurality of customers;

fifth program instructions for generating a summation of said staff requirements for all customers; and sixth program instructions for adjusting said staff requirements for all customers by an expected absenteeism factor, fatigue factor, breaks requirements, and vacation patterns to generate said staffing requirements and productivity targets for said demanufacturing enterprise; and wherein said first, second, third, fourth, fifth and sixth program instructions are recorded on said computer readable medium.

* * * * *